United States Patent
Krasner et al.

(10) Patent No.: US 12,079,154 B2
(45) Date of Patent: Sep. 3, 2024

(54) NON-TRANSPARENT BRIDGE SELECTION

(71) Applicant: Dell Products, L.P., Hopkinton, MA (US)

(72) Inventors: Jonathan Krasner, Coventry, RI (US); Ro Monserrat, Medfield, MA (US); Jerome Cartmell, Millis, MA (US); Thomas Mackintosh, Boston, MA (US)

(73) Assignee: Dell Products, L.P., Hopkinton, MA (US)

( * ) Notice: Subject to any disclaimer, the term of this patent is extended or adjusted under 35 U.S.C. 154(b) by 128 days.

(21) Appl. No.: 18/152,257

(22) Filed: Jan. 10, 2023

(65) Prior Publication Data
US 2024/0232120 A1    Jul. 11, 2024

(51) Int. Cl.
G06F 13/40    (2006.01)
G06F 13/42    (2006.01)

(52) U.S. Cl.
CPC ...... G06F 13/4221 (2013.01); G06F 13/4009 (2013.01); G06F 2213/0026 (2013.01)

(58) Field of Classification Search
CPC ............. G06F 13/4004; G06F 13/4009; G06F 13/4027; G06F 13/4031; G06F 13/4221; G06F 2013/0026
USPC .......... 709/212; 710/1, 27, 28, 38, 113, 240, 710/306, 309, 312
See application file for complete search history.

(56) References Cited

U.S. PATENT DOCUMENTS

| | | | | |
|---|---|---|---|---|
| 7,062,594 B1* | 6/2006 | Sardella | ............. | G06F 13/4027 710/316 |
| 2013/0254487 A1* | 9/2013 | Tanaka | ............... | G06F 11/2017 711/123 |
| 2015/0186310 A1* | 7/2015 | Levy | ..................... | G06F 13/287 710/308 |
| 2020/0226078 A1* | 7/2020 | Tanaka | ............... | G06F 12/0806 |
| 2021/0271576 A1* | 9/2021 | Su | ......................... | G06F 11/201 |

* cited by examiner

*Primary Examiner* — Ilwoo Park
(74) *Attorney, Agent, or Firm* — Anderson Gorecki LLP

(57) ABSTRACT

A storage engine has a pair of compute nodes, each compute node having a separate PCIe root complex and attached memory. The PCIe root complexes are interconnected by multiple Non-Transparent Bridge (NTB) links. The NTB resources are unequally shared, such that host IO devices are required to use a first subset of the NTB links to implement memory access operations on the memory of the peer compute node, whereas storage software memory access operations are able to be implemented on all of the NTB links. A NTB link arbitration system arbitrates usage of the first and second subsets of NTB links by the storage software, to distribute subsets of the storage software memory access operations on peer memory to the first and second subsets of NTB links, while causing all host IO device memory access operations on peer memory to be implemented on the first set of NTB links.

17 Claims, 8 Drawing Sheets

Host read/write IO over NTB

NON-TRANSPARENT BRIDGE SELECTION

FIELD

This disclosure relates to computing systems and related devices and methods, and, more particularly, to a method and apparatus for non-transparent bridge selection in a storage engine including multiple unequally shared non-transparent bridge resources.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a storage engine is implemented to include two compute nodes. Each compute node has a separate PCIe root complex, and the compute nodes are interconnected within the storage engine by a set of Non-Transparent Bridge (NTB) links. Host IO devices on each compute node receive IO operations from hosts, and implement direct read/write IO operations on the local memory connected to the PCIe root complex on the local compute node. Host IO devices on each compute node are also able to implement direct read/write IO operations on the peer memory connected to the PCIe root complex of the peer compute node.

Multiple NTB links extend between the root complexes of the two compute nodes. In some embodiments, due to the configuration of the host IO devices, the host IO devices are able to access a subset of the multiple NTB links. Accordingly, all IO operations on peer memory by the host IO devices are required to be implemented on the subset of the multiple NTB links that extend between the root complexes of the two compute nodes.

Storage software on a local compute node is also able to implement direct read/write operations on both the local memory on the local compute node and on the peer memory of the peer compute node. Storage software operations on the peer memory are allowed to use any available NTB link, including the set of NTB links that are required to be used by the host IO devices.

To mitigate effects of unbalanced host IO device usage of particular non-transparent bridge links, a NTB arbitration system maintains a NTB usage table to monitor usage of the NTB links by host IO devices and storage software on the compute node. Each time a host IO device or the storage software implements a read/write IO operation on the peer memory on one of the NTB links, the usage of the NTB link is reported to the NTB arbitration system. Host IO device read/write IO operations on the peer memory are always implemented on a required subset of the NTB links. Accordingly, in some embodiments, host IO devices do not request NTB path selection from the NTB arbitration system when implementing host IO device read/write IO operations on the peer memory.

Because storage software is able to use any available NTB link, when the storage software initiates a storage access operation on peer memory that requires use of one of the NTB links, the storage software queries the NTB arbitration system for selection of a NTB link to be used to implement the read/write IO operation on the peer memory. The NTB arbitration system selects between one of the host IO device required NTB links and one of the other NTB links based on usage patterns on the NTB links, and instructs the storage software of the NTB link selection. The storage software uses the selected link to implement the read/write IO operation on the peer memory.

In some embodiments a method of implementing non-transparent bridge selection in a storage engine including multiple unequally shared Non-Transparent Bridge (NTB) resources including a plurality of NTB links interconnecting a local compute node and a peer compute node within the storage engine includes implementing host IO device memory access operations on a peer memory in a peer compute node by host IO devices residing on the local compute node, the host IO devices being connected to the peer memory by a first subset of the NTB links to a peer PCIe root complex in the peer compute node, implementing storage software memory access operations on the peer memory in the peer compute node by storage software instantiated on the local compute node, the storage software being configured to access the peer memory by both the first subset of the NTB links to the peer PCIe root complex in the peer compute node and by a second subset of the NTB links to the peer PCIe root complex in the peer compute node, and arbitrating usage of the first subset of the NTB links and the second subset of the NTB links by the storage software, to cause a first subset of the storage software memory access operations on the peer memory to be implemented on the first subset of the NTB links and to cause a second subset of the storage software memory access operations on the peer memory to be implemented on the second subset of the NTB links, while causing all of the host IO device memory access operations on the peer memory to be implemented on the first subset of the NTB links.

In some embodiments, the first subset of the NTB links include a first plurality of the NTB links; the second subset of the NTB links include a second plurality of NTB links; and the first subset of the NTB links does not include any NTB link included in the second subset of the NTB links.

In some embodiments, the method further includes transmitting host IO device NTB link usage information associated with each host IO device memory access operation implemented on the peer memory to an NTB link arbitration system, and transmitting storage software NTB link usage information associated with each storage software memory access operation implemented on the peer memory to the NTB link arbitration system.

In some embodiments, arbitrating usage of the first subset of the NTB links and the second subset of the NTB links by the storage software includes using the host IO device NTB link usage information and the storage software NTB link usage information to update NTB link data usage values of a NTB usage data structure, the NTB usage data structure including a data usage value for each of the NTB links, and using the NTB link data usage values, by the NTB link arbitration system, to select a respective NTB link to be used to implement each respective storage software memory access operations on the peer memory.

In some embodiments, the NTB link data usage values are exponential moving average NTB link usage values.

In some embodiments, using the NTB link data usage values by the NTB link arbitration system includes selecting the respective NTB link with a lowest respective NTB link data usage value.

In some embodiments, a storage engine includes a local compute node having a local PCIe root complex connected to a local memory, a peer compute node having a peer PCIe root complex connected to a peer memory, a first subset of Non-Transparent Bridge (NTB) links interconnecting the local PCIe root complex of the local compute node with the peer PCIe root complex of the peer compute node, and a second subset of NTB links interconnecting the local PCIe root complex of the local compute node with the peer PCIe root complex of the peer compute node, the first subset of NTB links and the second subset of NTB links being mutually exclusive, such that the first subset of NTB links does not include any of the NTB links of the second subset of NTB links, and the second subset of NTB links does not include any of the NTB links of the first subset of NTB links. The storage engine also includes a plurality of local host IO devices on the local compute node, the local host IO devices being configured to implement direct IO operations on local memory via the local PCIe root complex and being configured to implement direct IO operations on the peer memory via the peer PCIe root complex using the first subset of NTB links, and storage software on the local compute node being configured to implement direct IO operations on local memory via the local PCIe root complex and being configured to implement direct IO operations on the peer memory via the peer PCIe root complex using both the first subset of NTB links and the second subset of NTB links. The storage engine also includes one or more computers and one or more storage devices storing instructions that are operable to implement an NTB link arbitration system, the instructions, when executed by the one or more computers, cause the NTB link arbitration system to perform operations including arbitrating usage of the first subset of NTB links and the second subset of NTB links by storage software, to cause a first subset of the storage software memory access operations on the peer memory to be implemented on the first subset of NTB links and to cause a second subset of the storage software memory access operations on the peer memory to be implemented on the second subset of NTB links, while causing all of the host IO device memory access operations on the peer memory to be implemented on the first subset of the NTB links.

In some embodiments, the host IO devices are configured to transmit NTB link usage information associated with each host IO device memory access operation implemented on the peer memory to the NTB link arbitration system, and the storage software is configured to transmit NTB link usage information associated with each storage software memory access operation implemented on the peer memory to the NTB link arbitration system.

In some embodiments, the instructions, when executed by the one or more computers, further cause the NTB link arbitration system to perform operations including using the host IO device NTB link usage information and the storage software NTB link usage information to update NTB link data usage values of a NTB usage data structure, the NTB usage data structure including a data usage value for each of the NTB links, and using the NTB link data usage values, by the NTB link arbitration system, to select a respective NTB link to be used to implement each respective storage software memory access operations on the peer memory.

In some embodiments, the NTB link data usage values are exponential moving average NTB link usage values.

In some embodiments, using the NTB link data usage values by the NTB link arbitration system includes selecting the respective NTB link with a lowest respective NTB link data usage value.

In some embodiments, a non-transitory tangible computer-readable medium storing software for implementing non-transparent bridge selection in a storage engine including multiple unequally shared Non-Transparent Bridge (NTB) resources including a plurality of NTB links interconnecting a local compute node and a peer compute node within the storage engine, including instructions executable by one or more computers which, upon such execution, cause the one or more computers to perform operations including implementing host IO device memory access operations on a peer memory in a peer compute node by host IO devices residing on the local compute node, the host IO devices being connected to the peer memory by a first subset of the NTB links to a peer PCIe root complex in the peer compute node, implementing storage software memory access operations on the peer memory in the peer compute node by storage software instantiated on the local compute node, the storage software being configured to access the peer memory by both the first subset of the NTB links to the peer PCIe root complex in the peer compute node and by a second subset of the NTB links to the peer PCIe root complex in the peer compute node, and arbitrating usage of the first subset of the NTB links and the second subset of the NTB links by the storage software, to cause a first subset of the storage software memory access operations on the peer memory to be implemented on the first subset of the NTB links and to cause a second subset of the storage software memory access operations on the peer memory to be implemented on the second subset of the NTB links, while causing all of the host IO device memory access operations on the peer memory to be implemented on the first subset of the NTB links.

In some embodiments, the first subset of the NTB links include a first plurality of the NTB links; the second subset of the NTB links include a second plurality of NTB links; and the first subset of the NTB links does not include any NTB link included in the second subset of the NTB links.

In some embodiments, the non-transitory tangible computer-readable medium further includes instructions executable by one or more computers which, upon such execution, cause the one or more computers to perform operations including transmitting host IO device NTB link usage information associated with each host IO device memory access operation implemented on the peer memory to an NTB link arbitration system, and transmitting storage software NTB link usage information associated with each storage software memory access operation implemented on the peer memory to the NTB link arbitration system.

In some embodiments, arbitrating usage of the first subset of the NTB links and the second subset of the NTB links by the storage software includes using the host IO device NTB link usage information and the storage software NTB link usage information to update NTB link data usage values of a NTB usage data structure, the NTB usage data structure including a data usage value for each of the NTB links, and using the NTB link data usage values, by the NTB link arbitration system, to select a respective NTB link to be used to implement each respective storage software memory access operations on the peer memory.

In some embodiments, the NTB link data usage values are exponential moving average NTB link usage values.

In some embodiments, using the NTB link data usage values by the NTB link arbitration system includes selecting the respective NTB link with a lowest respective NTB link data usage value.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
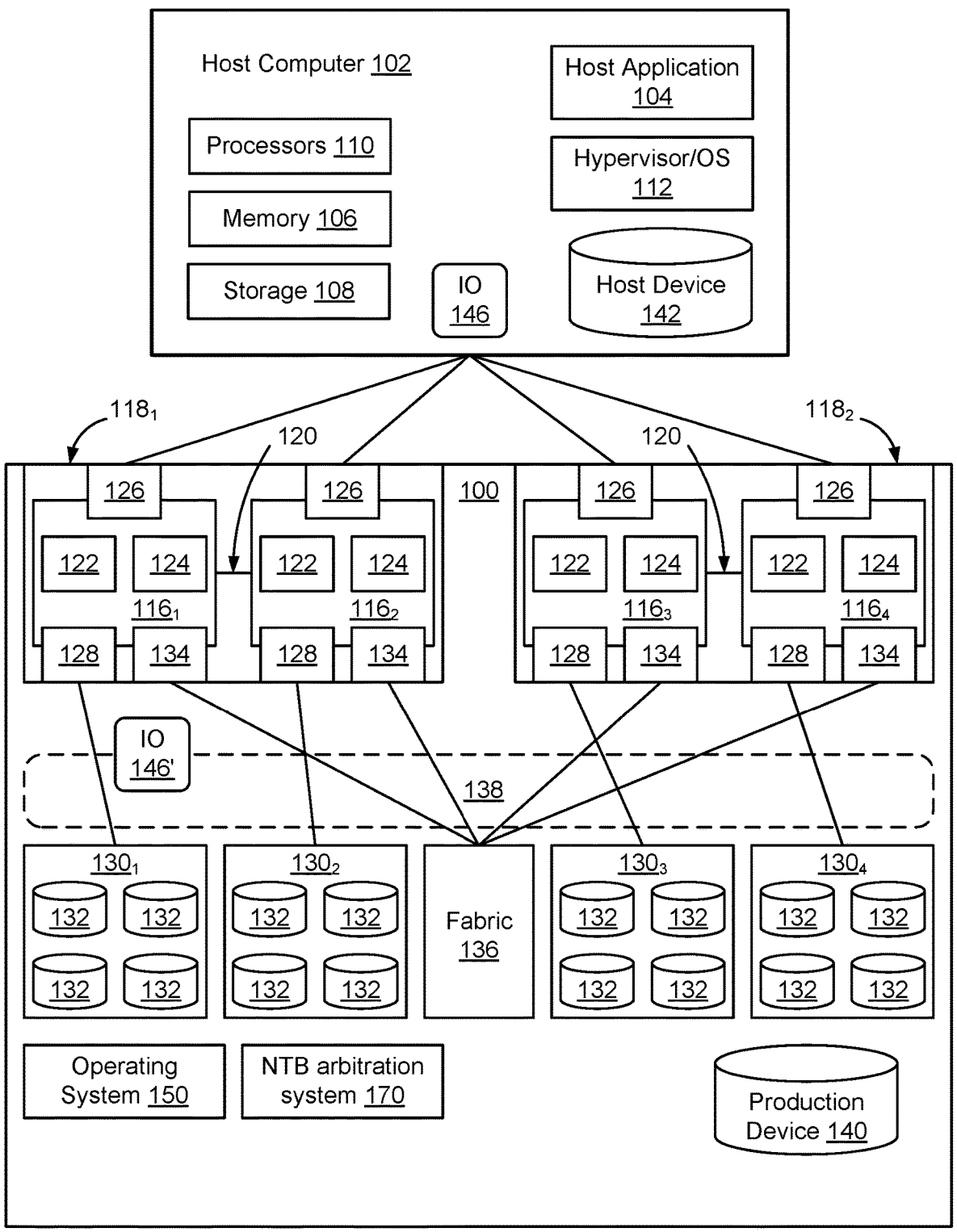
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local memory 124. The processors 122 may include a plurality of multi-core processors of one or more types, e.g., including multiple CPUs, GPUs, and combinations thereof. The local memory 124 may include, for example and without limitation, any type of volatile storage or non-volatile storage. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local memory 124 to be accessed by other compute nodes 116, e.g., via DMA (Direct Memory Access) or RDMA (Remote Direct Memory Access).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in memory 124 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the I memory 124 or on managed drives 132. If the commanded data is not in the memory 124, then the data is temporarily copied into the memory 124 from the managed drives 132 and sent to the host application 104 by the front-end adapter 126 of one of the compute nodes $116_1$-$116_4$. In the case where the IO 146 is a write command, in some embodiments the storage system 100 copies a block being written into the memory 124, marks the data as dirty, and creates new metadata that maps the address of the data on the production device 140 to a location to which the block is written on the managed drives 132.

Figure 2:
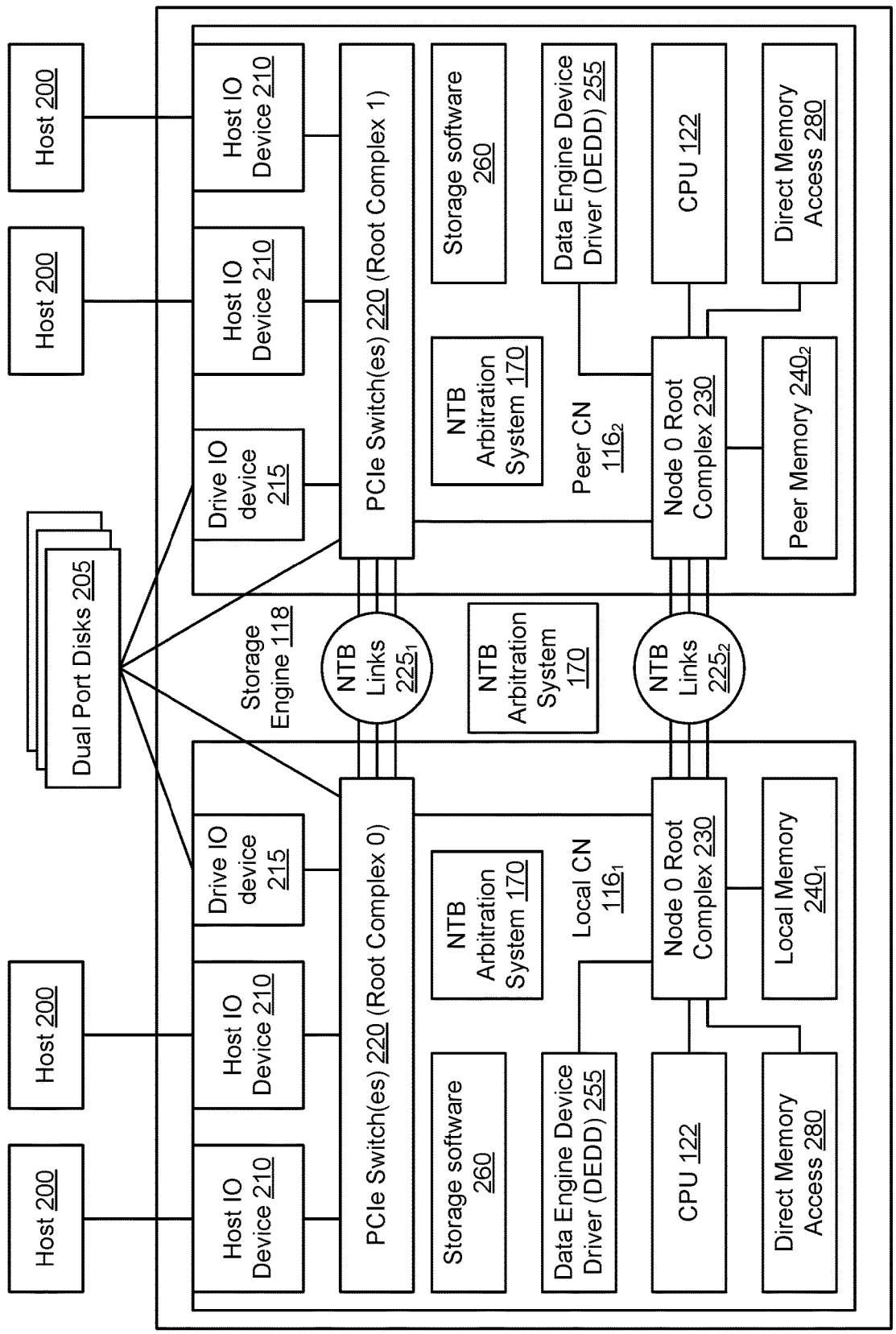
FIG. 2 is a functional block diagram an example storage engine having two compute nodes with separate PCIe root complexes, interconnected with a set of PCIe Non-Transparent Bridge (NTB) links, according to some embodiments.

FIG. 2 is a functional block diagram an example storage engine having two compute nodes $116_1$, $116_2$, with separate PCIe root complexes 230, interconnected with a set of PCIe Non-Transparent Bridge (NTB) links $225_1$, $225_2$, according to some embodiments. In the following description, for ease of explanation, compute node $116_1$ is referred to herein as the "local" compute node, and compute node $116_2$ is referred to herein as the "peer" compute node. It should be understood that both compute nodes $116_1$, $116_2$, are used to implement host IO operations and, hence, when host IO operations are received on compute node $116_2$, compute node $116_2$ will be considered the "local" compute node in connection with servicing that operation, and compute node $116_1$, would be considered the "peer" compute node.

In a mirrored storage system, where compute nodes share memory via non-transparent bridge (NTB) links, the links may be used by many different storage software subsystems to perform direct memory reads or writes to the peer compute node $116_2$. The storage software can access the peer memory $240_2$ via software, Direct Memory Access (DMA) engines, or may use the Host IO device IO device DMA controllers to complete IOs over an NTB link 225. Host IO devices may also use the NTB 225 to directly read data from the peer memory $240_2$ of the peer compute node $116_2$ and directly write data to the peer memory $240_2$ of the peer compute node $116_2$ without software intervention.

As shown in FIG. 2, in some embodiments each compute node $116_1$, $116_2$, includes a set of host IO devices 210. Host IO devices 210 may be implemented as Subscriber Line Interface Card (SLIC) devices, each of which has a Fibre Channel (FC) driver that manages host IO operations on the host IO device 210 and controls operation of the host IO device 210. The host IO devices 210 receive IO read and write operations from hosts 200, and hardware and firmware of the host IO devices 210 manage the host IO read and write operations on the storage engine 118. For host read IO operations, the host IO device 210 uses an API to obtain the physical address of the requested data, and implements a direct read of the requested data either from local memory $240_1$ or from peer memory $240_2$ over the NTB 225 to obtain the requested data and respond to the host read IO operation. For host write IO operations, the host IO device 210 translates the destination address of the host write IO operation to a dual-cast region 260 of the PCIe switch 220 and sends the write IO operation to the PCIe switch 220. The PCIe switch 220 splits the write IO operation into two write IOs—a first write IO that is sent to the local memory $240_1$, and a second write IO that is sent over the NTB 225 to be implemented on the peer memory $240_2$ of the peer compute node $116_2$.

As shown in FIG. 2, in some embodiments each compute node $116_1$, $116_2$, of a given storage engine 118 has a separate PCIe root complex 230. A PCIe switch 220 interconnects host IO devices 210 with the PCIe root complex 230. Each compute node $116_1$, $116_2$, also includes memory $240_1$, $240_2$, that is also connected to the PCIe root complex 230.

As shown in FIG. 2, the PCIe root complexes 230 on separate compute nodes $116_1$, $116_2$, of a storage engine 118 are interconnected using a Non-Transparent Bridge 225. The Non-Transparent Bridge (NTB) 225 is a PCIe intra-node bridge that enables data transport between compute nodes $116_1$, $116_2$, implemented using different root complexes 230. In some embodiments, the NTB 225 is the data transport used by software to cause write operations to be mirrored to be implemented in both local memory $240_1$ and peer memory $240_2$, and is also used to obtain locks on the peer memory $240_2$ in connection with direct read operations on the peer memory $240_2$.

As shown in FIG. 2, in some embodiments, the host IO devices 210 are connected to PCIe switch 220, and implement read/write IO operations on peer memory $240_2$ over a first set of NTB links $225_1$, that are upstream of the host IO devices 210 and are required to be used by the host IO devices 210 due to the configuration of the storage engine. The storage software 260 is also able to initiate read/write IO operations on peer memory $240_2$. However, in some embodiments, the storage software 260 read/write IO operations are able to be implemented using both the NTB links $225_1$ that are upstream of the host IO devices 210, as well as a second set of NTB links $225_2$ that are downstream from the host IO devices 210, and hence can't be used by the host IO devices 210 to implement direct memory operations on the peer memory $240_2$ of the compute node $116_2$. Although FIG. 2 shows the different sets of NTB links connected to different components (PCIe switch 220 and root complex 230), it should be understood that the manner in which the different sets of NTB links are implemented is a matter of design choice and will depend on the particular implementation.

Figure 3:
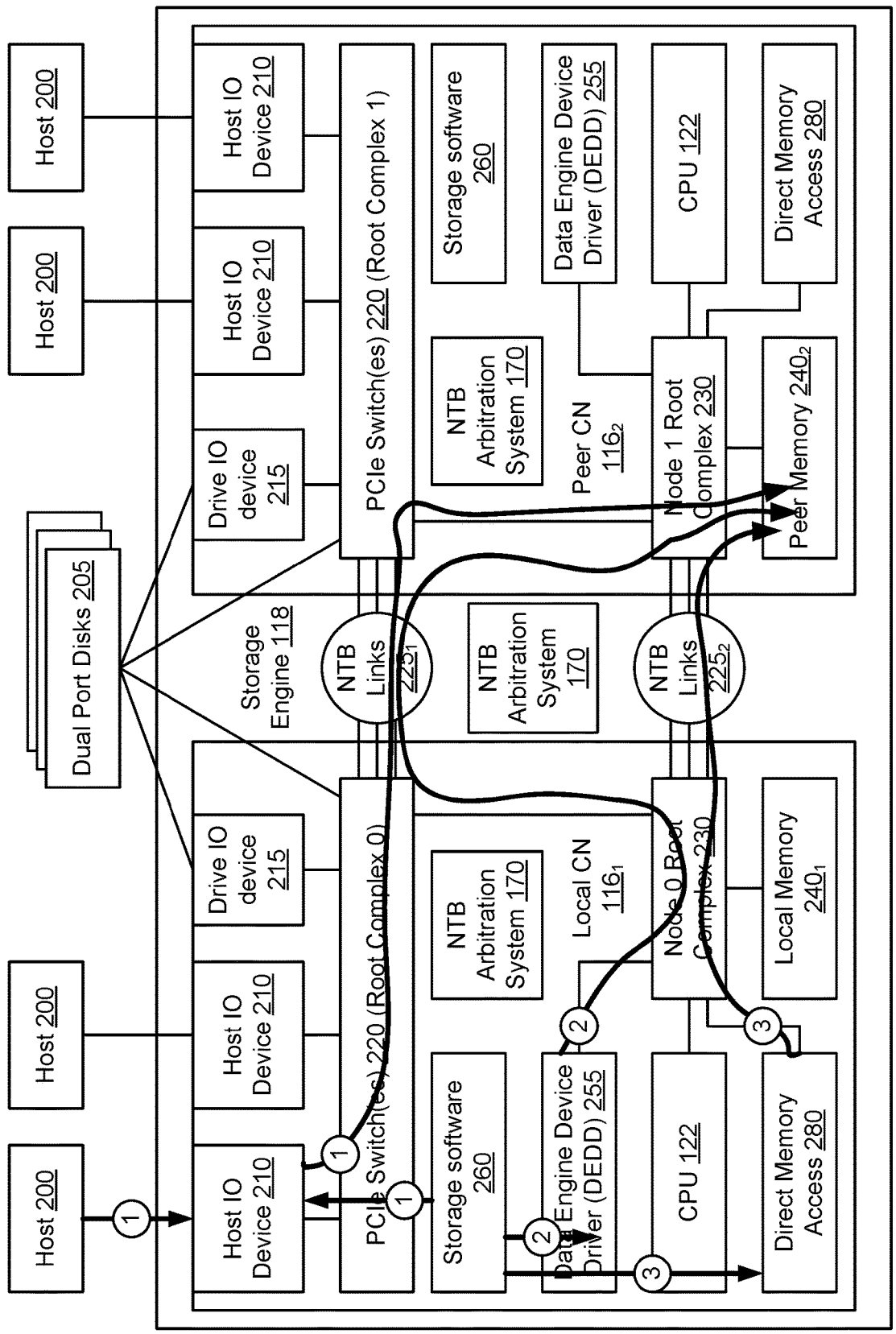
FIG. 3 is a functional block diagram of the example storage engine of FIG. 2, and showing several direct read/write operations by a host IO device and storage software on the peer memory of the peer compute node over selected PCIe Non-Transparent Bridge (NTB) links, according to some embodiments.

FIG. 3 is a functional block diagram of the example storage engine of FIG. 2, and showing several direct read/write operations by a host IO device 210 and storage software 260 on the peer memory $240_2$ of the peer compute node $116_2$, over selected PCIe Non-Transparent Bridge (NTB) links 225, according to some embodiments. As shown in FIG. 3, in some embodiments the host IO device 210 and storage software 260 can initiate IO operations (read and write operations) on peer memory $240_2$. For example, as shown in FIG. 3, in some embodiments host IO device 210 can initiate an IO operation (arrow 1) on peer memory $240_2$. The storage software 260 can also instruct the host IO device 210 to implement an IO operation on peer memory $240_2$ (arrow 1), for example using a host IO device's DMA controller to implement data movement operations affecting peer memory $240_2$. As shown in FIG. 3, in some embodiments all IO operations by host IO device 210, on peer memory $240_2$, are implemented over a specified set of NTB links $225_1$.

As shown in FIG. 3, in some embodiments the storage software 260 is also able to initiate IO operations on peer memory $240_2$ through other components of the compute node $116_1$, such as data engine device driver (DEDD) 255 (arrow 2) or Direct Memory Access (DMA) engine 280 (arrow 3). These operations can go over any of the NTB links $225_1$, $225_2$. For example, in FIG. 3 the IO operation from the DEDD 255 (arrow 2) is shown as going over the subset of the NTB links $225_1$ that are required to be used by the host IO devices 210, while the IO operation from the DMA engine 280 (arrow 3) is shown as going over one of the other NTB links $225_2$.

In some architectures the host IO devices 210 share access to a bus that has upstream NTB links 225 to the root complex 230 of the peer compute node $116_2$, and are required to use the upstream NTB link 225 on the shared bus. By contrast, some NTB links 225 without a downstream host IO device 210 will only support storage software 260 IO operations. As a result, a given set of NTB links $225_1$ may need to support the throughput of both the host IO device 210 and storage software 260, while other NTB links $225_2$ may only need to support the throughput of storage software 260. This can result in an unbalanced condition, where the storage engine 118 includes a plurality of NTB resources that are unequally shared between the components of the compute nodes, and in which particular NTB links are over-subscribed with workload, while other NTB links are underutilized within the storage engine.

To mitigate the effects of unbalanced host IO device 210 usage of particular non-transparent bridge links 225, in some embodiments a NTB arbitration system 170 is provided to distribute storage software 260 IO operations on peer memory $240_2$ between the both the subset of NTB links $225_1$ required to be used by the host IO devices 210 as well as to the subset of NTB links $225_2$ that are not able to be used by the host IO devices 210.

In some embodiments, since host IO device IO operations are often considered more critical than storage software 260 IO operations, the NTB arbitration system 170 preferentially allocates bandwidth on the subset of the NTB links $225_1$ to the host IO devices 210. During periods of high activity by the host IO devices 210, the storage software 260 IO operations are directed to the other NTB links $225_2$. During periods of low activity by the host IO devices 210, the storage software 260 IO operations are spread more evenly between both subsets of NTB links $225_1$ and $225_2$. Preventing storage software IO operations from being implemented on the subset of the NTB links $225_1$ provides host IO devices priority access to those NTB links $225_1$ to thus ensure that the subset of the NTB links $225_1$ are not overloaded with storage software IO operations. By enabling the storage software to use the subset of the NTB links $225_1$ during periods of low host IO device activity enables greater access by storage software 260 to peer memory $240_2$.

In some embodiments, as shown in FIGS. 2 and 3, the NTB arbitration system 170 is implemented as a process executing on each compute node $116_1$, $116_2$. In some embodiments, as shown in FIG. 1, the NTB arbitration system 170 is implemented as a process executing on an emulation on the storage system or on one or more of the storage engines 118. For example, a given storage engine 118 may implement an instance of the NTB arbitration system 170 that receives NTB link usage information from both compute nodes $116_1$, $116_2$.

Figure 4:
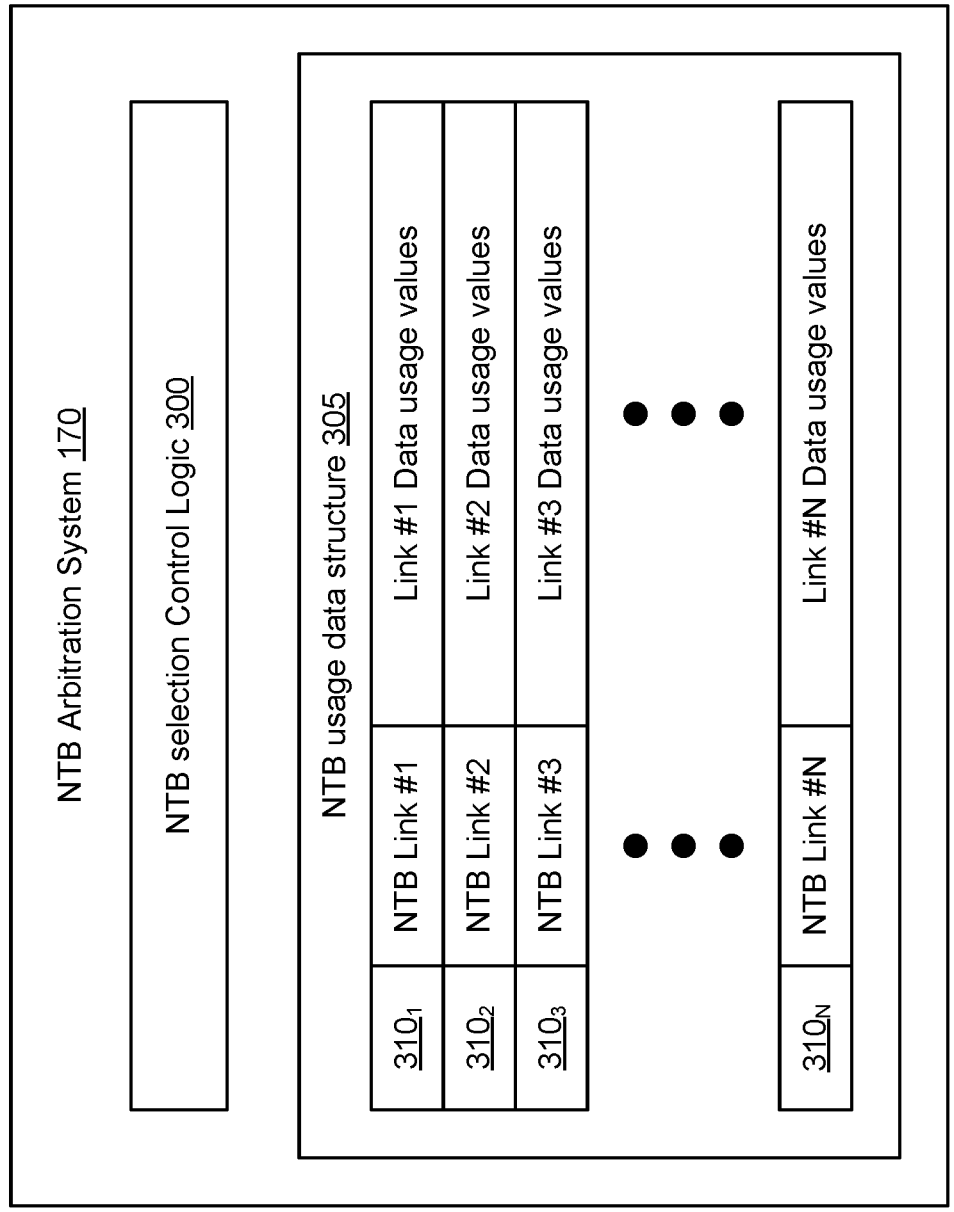
FIG. 4 is a functional block diagram of an example NTB arbitration system including a NTB usage data structure and configured to arbitrate use of the NTB links by the storage software, according to some embodiments.

FIG. 4 is a functional block diagram of an example NTB arbitration system 170 including a NTB selection control logic 300 and NTB usage data structure 305 that the NTB arbitration system 170 uses to monitor recent usage values of the NTB links $225_1$, $225_2$, connecting the compute nodes in the storage engine 118. In some embodiments the NTB arbitration system 170 is configured to arbitrate use of the NTB links 225 by the storage software 260. Additional details associated with some processes implemented by the NTB selection control logic 300 are provided in connection with FIGS. 5-8.

As shown in FIG. 4, in some embodiments the NTB arbitration system 170 includes a NTB usage data structure 305. Although some embodiments are described in which the NTB usage data structure 305 is implemented as a table, it should be understood that different embodiments may use different types of data structures other than tables to implement the NTB usage data structure 305. For example, counters, registers, or other structures may be used to keep track of NTB link 225 usage and the particular mechanism selected will depend on the particular embodiment.

As shown in FIG. 4, in some embodiments the NTB link usage data structure has a series of entries 310, each entry 310 corresponding to a respective NTB link 225. In FIG. 4 there are N entries $310_1$-$310_N$ corresponding to NTB links #1-#N. Each entry 310 also includes a record of recent NTB link usage. For example, as shown in FIG. 4, the record of recent NTB link usage may include an indication of an amount of data that was transmitted on the respective NTB link 225. The NTB link usage may be specified in many ways depending on the implementation. In some embodiments, the NTB link usage is specified as a value, such as an amount of data (MBPS) that was transmitted on the NTB link 225 in a previous recent time interval. The NTB link usage may also be specified based on a number of transactions on the NTB link 225, such as the number of IO operations per second (IOPS) that were implemented on the NTB link 225 in a recent time interval. The NTB link usage may also be specified as a relative number, such as a percentage usage value compared to a maximum best practices use limit, in either IOPS or MBPS.

Each time a transaction occurs on the NTB, the transaction is reported to the NTB arbitration system 170, for example by the host IO device 210 or the storage software 260. The transaction parameters, such as the existence of the transaction, the time of completion of the transaction, and the size of the transaction, are used by the NTB selection control logic to update the relevant entry of the NTB usage data structure 305. Optionally, the NTB selection control logic 300 may also remove usage information from the entries 310 of the NTB usage data structure 305, such that the entries 310 are continuously updated to ensure that the entries 310 contain information only about recent transactions on the respective NTB links 225.

In some embodiments, the NTB arbitration system 170 collects the amount of bytes being transferred across each NTB link, and internally generates rate values for each NTB link (bytes per unit of time). In some embodiments, these rates are implemented as exponential moving averages to smooth out the rate calculations, which can lead to better decision making by the NTB selection algorithm 300. An exponential moving average is a moving average that places a greater weight and significance on the most recent data points. Accordingly, in some embodiments the link data usage values maintained by the NTB usage data structure 305 are exponential moving average values of the number of bytes of data transmitted on the respective NTB link in a recent unit of time, placing more emphasis on recent transactions. An example unit of time may be one second, several seconds, a minute, or another time interval depending on the particular implementation.

Figure 5:
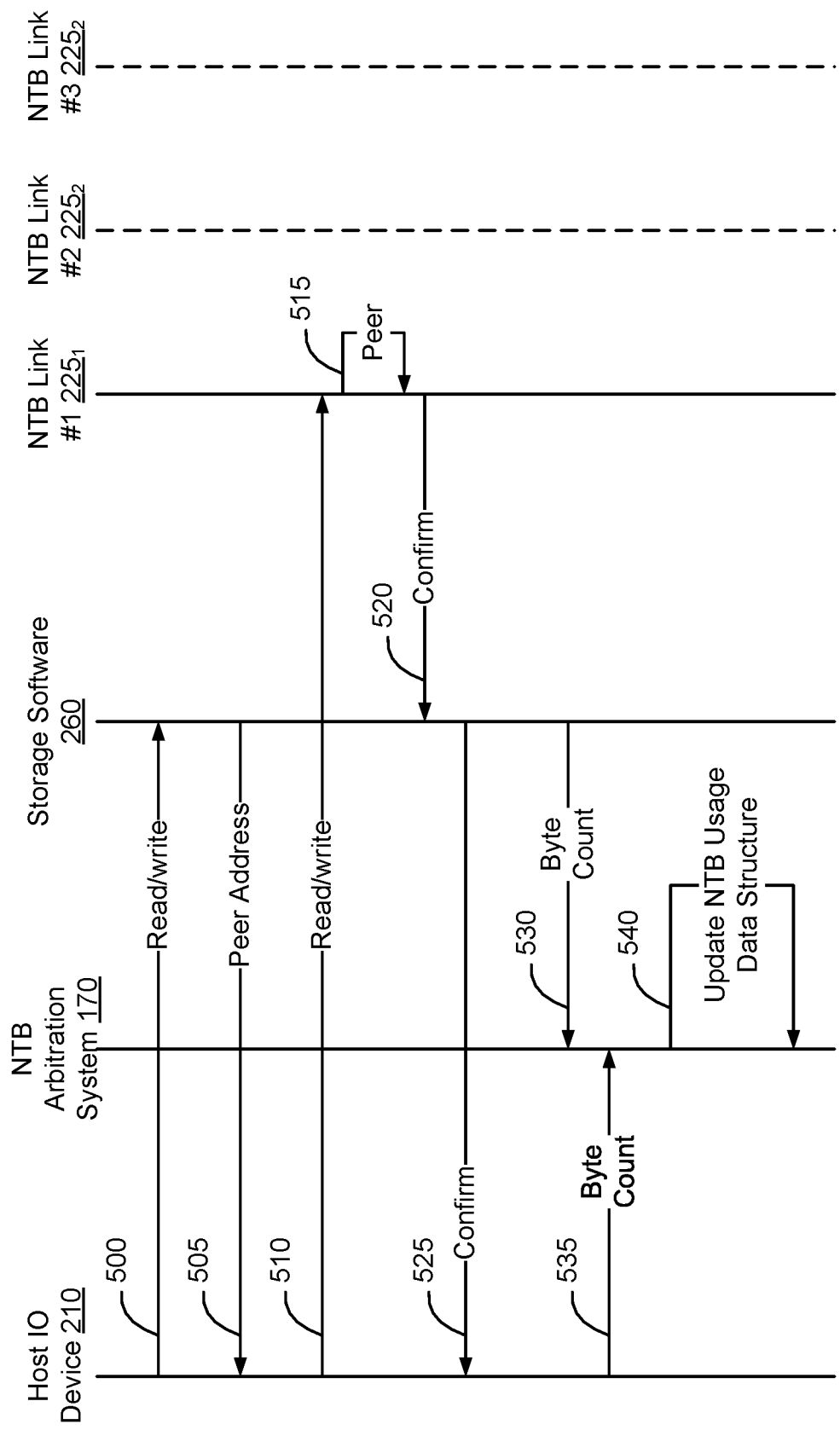
FIG. 5 is a swim lane diagram showing a host IO device direct read/write operation on peer memory of a peer compute node over a set of required NTB links, according to some embodiments.

FIG. 5 is a swim lane diagram showing a host IO device 210 direct read/write operation on peer memory $240_2$ of a peer compute node $116_2$, over a host IO device required NTB link $225_1$, according to some embodiments. When a host IO is received by a host IO device 210 from a host 200, the host IO device 210 notifies the storage software 260 of the incoming transaction (arrow 500). The storage software 260 determines the data is for the peer memory $240_2$ of the peer compute node $116_2$, prepares the data address, and shares the data address with the host IO device 210 (arrow 505).

The host IO device 210 issues a direct read/write operation (arrow 510) that is routed over a host IO device required NTB link $225_1$. In FIG. 5, NTB link #1 has been shown as being used by the host IO devices 210 to implement direct read/write operations on peer memory $240_2$. The other NTB links #2 and #3 are shown using dashed lines, since these NTB links $225_2$ are not available to be used by the host IO devices 210 to access peer memory $240_2$. In some embodiments the NTB link #1 is an upstream NTB link $225_1$, and the host IO device controller completes the direct read/write operation on peer memory $240_1$ on the host IO device required (upstream) NTB link $225_1$.

The memory access on the peer memory $240_2$ is implemented (arrow 515), and confirmation is returned to the storage software 260 (arrow 520). After data movement is successful, the storage software 260 informs the host IO device 210 that the transaction is complete (arrow 525), so that the host IO device 210 can move on to the next request.

In some embodiments, when the storage software 260 receives confirmation (arrow 520) or when the host IO device 210 is notified that the data movement is complete (arrow 525) the storage software 260 or the host IO device 210 transmits the byte count associated with the NTB usage to the NTB arbitration system 170 (arrow 530 or arrow 535). Upon receipt, the NTB arbitration system 170 updates the relevant entry for the NTB link 225 used by the host IO device 210 in the NTB usage data structure 305 (arrow 540).

Figure 6:
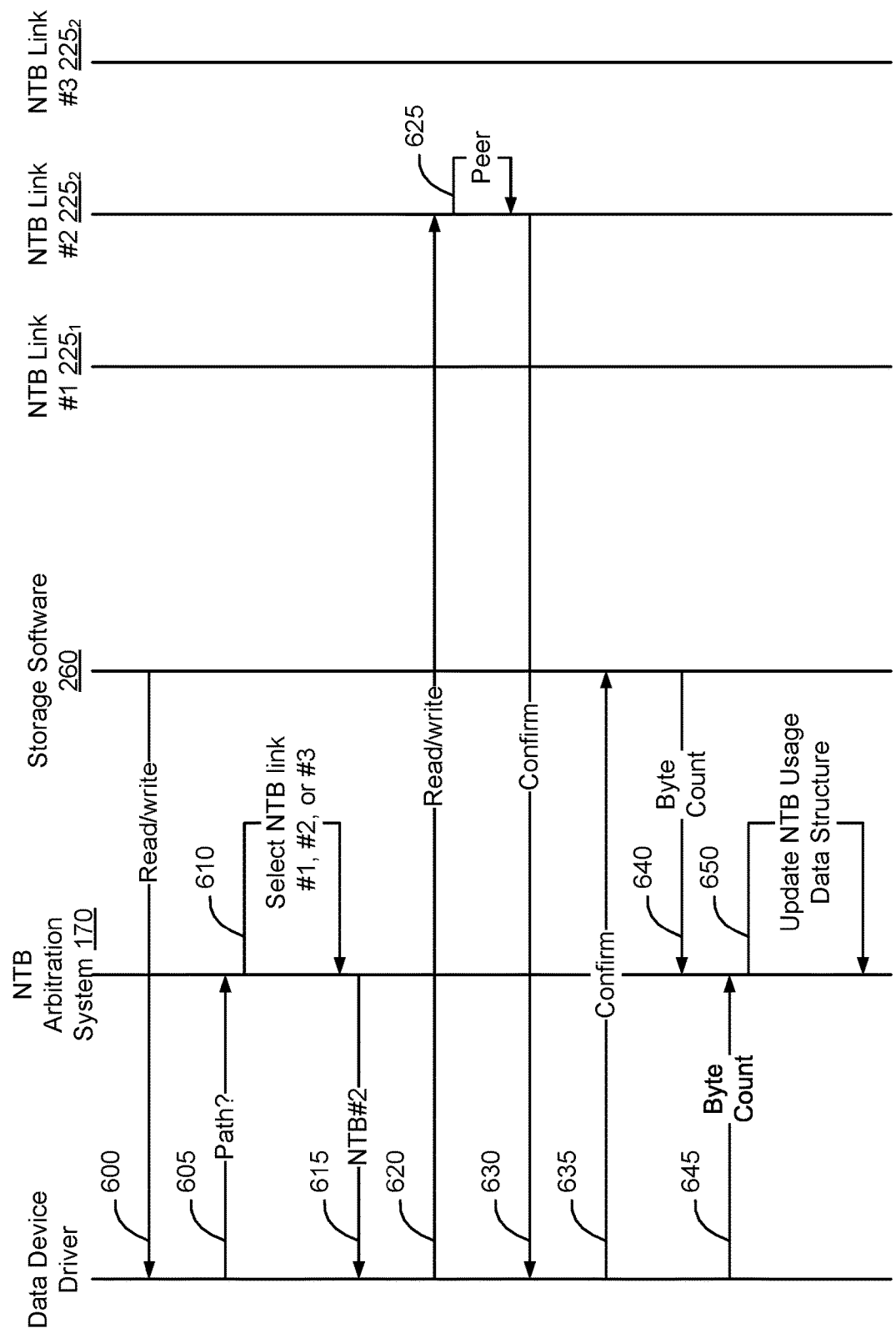
FIG. 6 is a swim lane diagram showing a storage software direct read/write operation on peer memory of a peer compute node over a set of available NTB links, according to some embodiments.

FIG. 6 is a swim lane diagram showing a storage software 260 direct read/write operation on peer memory 240 of the peer compute node $116_2$ over a set of available NTB links 225, according to some embodiments. As shown in FIG. 6, when the storage software 260 initiates a data movement operation that is to be implemented on peer memory $240_2$ via the NTB 225, the read/write operation is sent to a device driver (arrow 600). The data device driver may be a Direct Memory Access (DMA) engine, DEDD 225, host IO device 210 DMA driver, or another data device driver.

The data device driver is able to implement data movement operations between the local compute node $116_1$ and peer compute node $116_2$ on any available NTB link 225. When the data device driver determines that the read/write request has an address on the peer memory $240_2$ of the peer compute node $116_2$, the data device driver sends a request to the NTB arbitration system 170 (arrow 605) for NTB link 225 selection. In response to receipt of the request for NTB link 225 selection, the NTB arbitration system 170 determines an NTB link 225 that should be used to implement the data movement operation (arrow 610) and responds to the data device driver with an identification of the selected NTB link 225 (arrow 615). In FIG. 6, for illustration, NTB link #2 has been shown as being selected. It should be understood that the NTB arbitration system 170 may select any of the NTB links 225, NTB Link #1, NTB link #2, or NTB link #3. Further, although only three NTB links are shown in FIG. 6 for ease of illustration, it should be understood that any number of NTB links may be used to interconnect the compute nodes $116_1$, $116_2$, depending on the implementation.

The data device driver implements the data movement operation on the peer memory $240_2$ over the selected NTB link 225 (arrow 620). The memory access on the peer memory $240_2$ is implemented (arrow 625), and confirmation is returned to the data device driver (arrow 630), and to the storage software 260 (arrow 635). Although FIG. 6 shows the confirmation being sent first to the device driver and then to the storage software 260, it should be understood that the particular confirmation mechanism will depend on the particular implementation.

In some embodiments, when the storage software 260 receives confirmation (arrow 635), or when the data device driver is notified that the data movement is complete (arrow 630), the storage software 260 or the data device driver transmits the byte count associated with the NTB use to the NTB arbitration system 170 (arrow 640 or arrow 645). Upon receipt, the NTB arbitration system 170 updates the relevant entry for the NTB link 225 used by the storage software 260 in the NTB usage data structure 305 (arrow 650).

Figure 7:
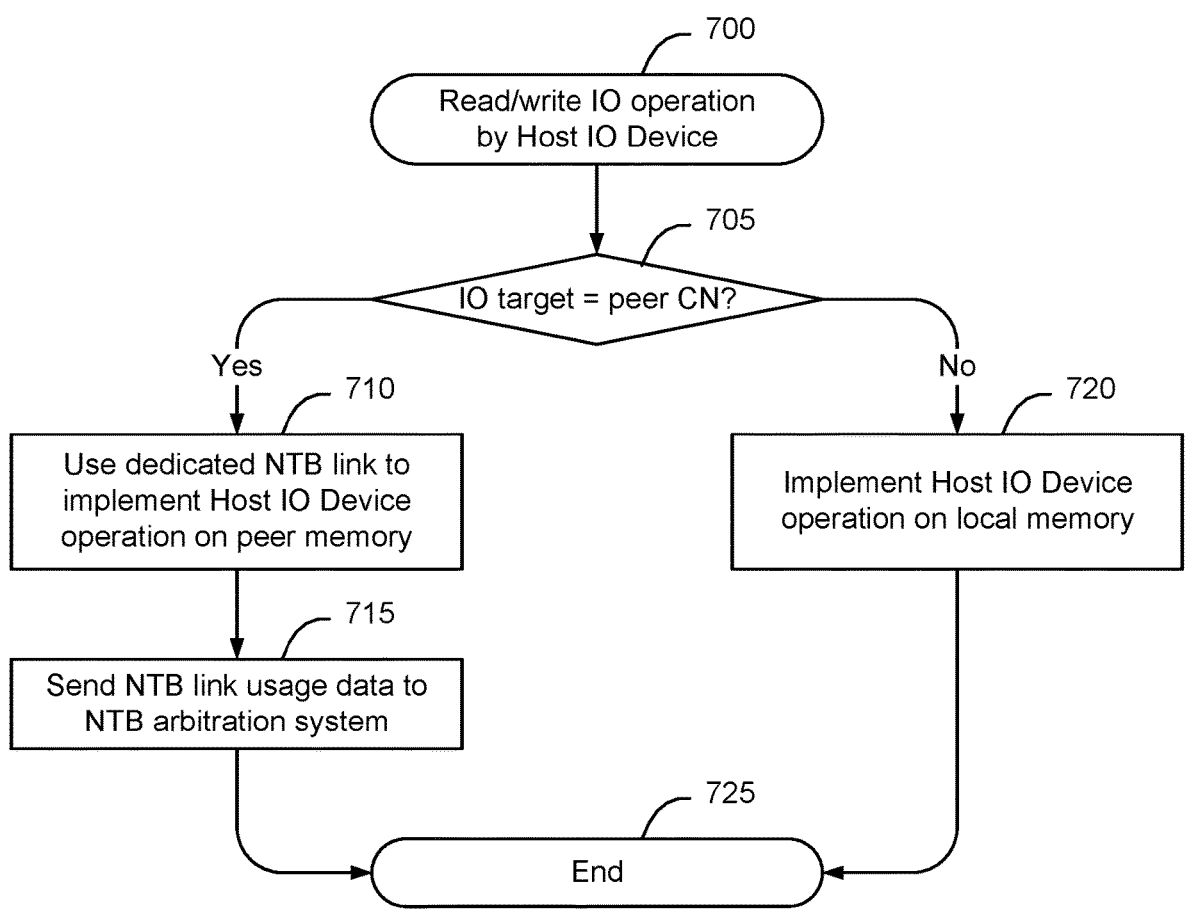
FIG. 7 is a flow chart showing an example process implemented by a host IO device in connection with a direct read/write operation on peer memory of a peer compute node over a set of required NTB links, according to some embodiments.

FIG. 7 is a flow chart showing an example process implemented by a host IO device 210 in connection with a direct read/write operation on peer memory $240_2$ of peer compute node $116_2$ over a host IO device required NTB link $225_1$, according to some embodiments. As shown in FIG. 7, in some embodiments, when a read/write IO operation is received by a host IO device 210 (block 700), the host IO device 210 notifies the storage software 260 to determine if the target address is in the local memory $240_1$ of the local compute node $116_1$, or in the peer memory $240_2$ of the peer compute node $116_2$ (block 705). In some instances, for example in connection with a mirrored write operation, the target address may require data to be written to both a slot of local memory and to a slot of peer memory $240_2$. In some instances, for example in connection with a read from an unmirrored slot of memory, the target address may be on either the local memory $240_1$ or on the peer memory $240_2$, depending on the location of the requested data.

In instances where the host IO device 210 determines that the target address of the IO operation is on the peer memory $240_2$ on the peer compute node 116 (a determination of YES at block 705), the host IO device 210 uses the specified (upstream) NTB link $225_1$ to implement the host IO device 210 operation on the peer memory $240_2$ of the peer compute node $116_2$ (block 710). After completion of the read/write operation on the NTB link, the host IO device 210 sends the NTB link 225 usage data to the NTB arbitration system (block 715) and the host IO device 210 operation on peer memory $240_2$ ends (block 725). In instances where the host IO device determines that the target IO is on the local memory $240_1$ of the local compute node $116_1$ (a determination of NO at block 705), the host IO device 210 implements the IO operation on the local memory $240_1$, e.g., via the PCIe bridge 230 (block 720), and the host IO device 210 operation on local memory 240 ends (block 725).

Figure 8:
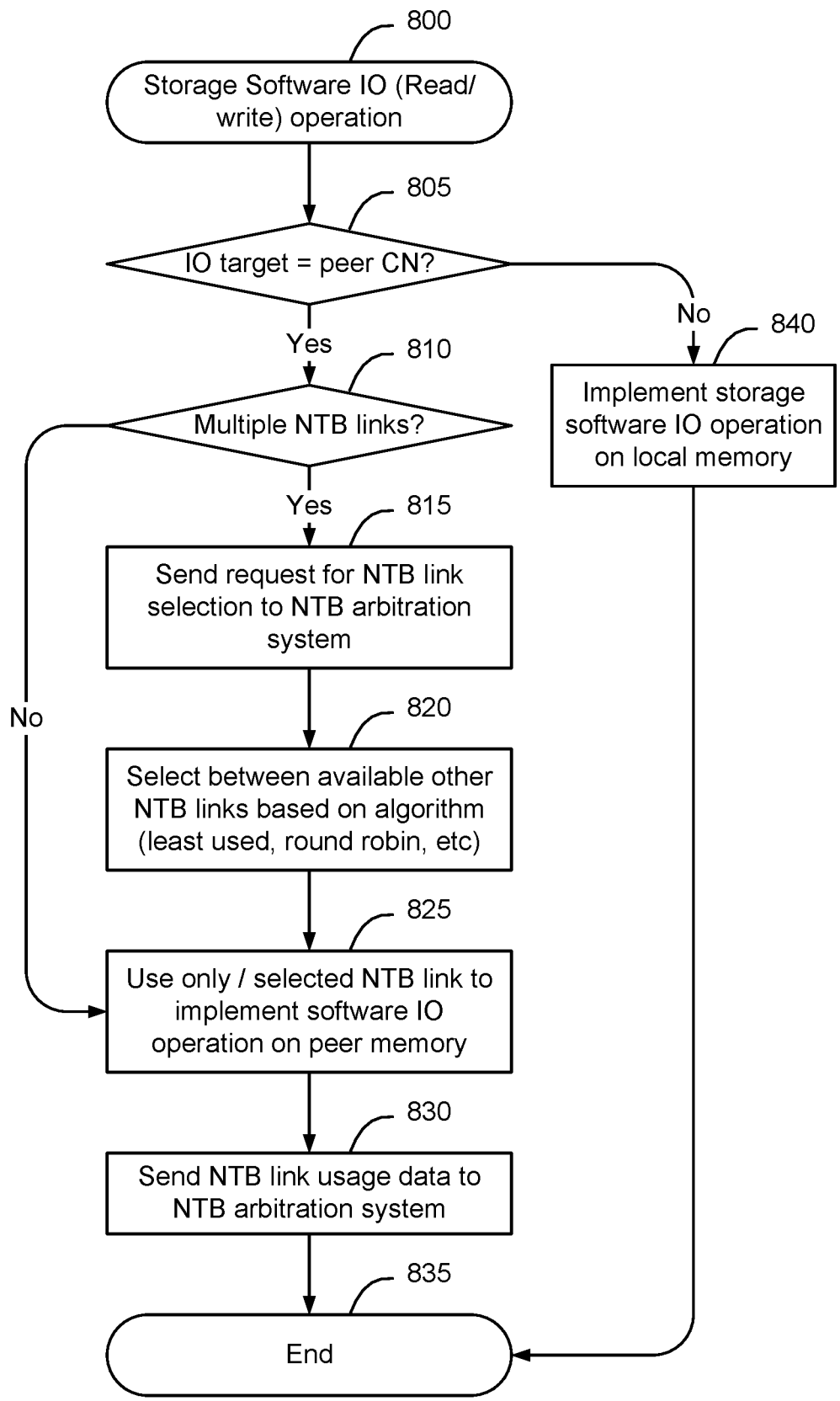
FIG. 8 is a flow chart showing an example process of implementing a direct read/write operation on peer memory of the peer compute node over a set of available NTB links by storage software, according to some embodiments.

FIG. 8 is a flow chart showing an example process of implementing a direct read/write operation on peer memory $240_2$ of the peer compute node $116_2$ over a set of available NTB links 225 by storage software 260, according to some embodiments. As shown in FIG. 8, when the storage software 260 IO operation is initiated (block 800) a determination is made as to whether the target address is a location on the peer compute node $116_2$ (block 805). In response to a determination that the target address is an address in local memory 240 on the local compute node $116_1$ (a determination of NO at block 805), the IO operation is implemented on the local memory $240_1$ (block 840) and the storage software 260 IO operation on local memory $240_1$ ends (block 835).

In response to a determination that the target address is an address in peer memory $240_2$ on the peer compute node $116_2$ (a determination of YES at block 805), in some embodiments a determination is made as to whether there are multiple available NTB links 225 (block 810). In instances where there are not multiple NTB links 225 to the peer compute node $116_2$ (a determination of NO at block 810), in some embodiments the IO operation is implemented on the only available NTB link 225 (block 825). The NTB link usage is then sent to the NTB arbitration system 170 (block 830) and the storage software 260 IO operation on peer memory $240_2$ ends (block 835).

In response to a determination that the are multiple available NTB links 225 that may be used to implement the IO operation on the peer compute node $116_2$ (a determination of YES at block 810), a request is sent to the NTB arbitration system 170 to request allocation of one of the NTB links 225 for use to implement the IO operation on the peer memory $240_2$ of the peer compute node $116_2$ (block 815).

In some embodiments, upon receipt of a request for selection of an NTB link 225 for use in connection with a storage software 260 IO (read/write) operation, the NTB arbitration system 170 selects between available NTB links 225 using a selection algorithm (block 820).

Example selection algorithms may be to select one of the NTB links 225 with the least amount of recent IO usage, to select one of the NTB links 225 with the lowest exponential moving average usage value, to implement a round robin selection process, or to use a different mechanism to select between the available other NTB links 225 (block 820). The selected NTB link is then used to implement the software IO operation on peer memory (block 825). The NTB link usage is then sent to the NTB arbitration system 170 (block 830) and the storage software 260 IO operation on peer memory $240_2$ ends (block 835).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing non-transparent bridge selection in a storage engine including multiple unequally shared Non-Transparent Bridge (NTB) resources including a plurality of NTB links interconnecting a local compute node and a peer compute node within the storage engine, comprising:
   implementing host Input/Output (IO) device memory access operations on a peer memory in a peer compute node by host IO devices residing on the local compute node, the host IO devices being connected to the peer memory by a first subset of the NTB links to a peer Peripheral Component Interconnect Express (PCIe) root complex in the peer compute node;
   implementing storage software memory access operations on the peer memory in the peer compute node by storage software instantiated on the local compute node, the storage software being configured to access the peer memory by both the first subset of the NTB links to the peer PCIe root complex in the peer compute node and by a second subset of the NTB links to the peer PCIe root complex in the peer compute node;
   arbitrating usage of the first subset of the NTB links and the second subset of the NTB links by the storage software, to cause a first subset of the storage software memory access operations on the peer memory to be implemented on the first subset of the NTB links and to cause a second subset of the storage software memory access operations on the peer memory to be implemented on the second subset of the NTB links, while causing all of the host IO device memory access operations on the peer memory to be implemented on the first subset of the NTB links.

2. The method of claim 1, wherein the first subset of the NTB links comprise a first plurality of the NTB links; wherein the second subset of the NTB links comprise a second plurality of NTB links; and wherein the first subset of the NTB links does not include any NTB link included in the second subset of the NTB links.

3. The method of claim 1, further comprising:
   transmitting host IO device NTB link usage information associated with each host IO device memory access operation implemented on the peer memory to an NTB link arbitration system; and
   transmitting storage software NTB link usage information associated with each storage software memory access operation implemented on the peer memory to the NTB link arbitration system.

4. The method of claim 3, wherein arbitrating usage of the first subset of the NTB links and the second subset of the NTB links by the storage software comprises:
   using the host IO device NTB link usage information and the storage software NTB link usage information to update NTB link data usage values of a NTB usage data structure, the NTB usage data structure including a data usage value for each of the NTB links; and
   using the NTB link data usage values, by the NTB link arbitration system, to select a respective NTB link to be used to implement each respective storage software memory access operations on the peer memory.

5. The method of claim 4, wherein the NTB link data usage values are exponential moving average NTB link usage values.

6. The method of claim 4, wherein using the NTB link data usage values by the NTB link arbitration system comprises selecting the respective NTB link with a lowest respective NTB link data usage value.

7. A storage engine, comprising:
   a local compute node having a local Peripheral Component Interconnect Express (PCIe) root complex connected to a local memory;
   a peer compute node having a peer PCIe root complex connected to a peer memory;
   a first subset of Non-Transparent Bridge (NTB) links interconnecting the local PCIe root complex of the local compute node with the peer PCIe root complex of the peer compute node, and a second subset of NTB links interconnecting the local PCIe root complex of the local compute node with the peer PCIe root complex of the peer compute node, the first subset of NTB links and the second subset of NTB links being mutually exclusive, such that the first subset of NTB links does not include any of the NTB links of the second subset of NTB links, and the second subset of NTB links does not include any of the NTB links of the first subset of NTB links;
   a plurality of local host Input/Output (IO) devices on the local compute node, the local host IO devices being configured to implement host IO device memory operations on local memory via the local PCIe root complex and being configured to implement host IO device memory operations on the peer memory via the peer PCIe root complex using the first subset of NTB links;
   storage software on the local compute node being configured to implement storage software memory operations on local memory via the local PCIe root complex and being configured to implement storage software memory operations on the peer memory via the peer PCIe root complex using both the first subset of NTB links and the second subset of NTB links; and
   one or more computers and one or more storage devices storing instructions that are operable to implement an NTB link arbitration system, the instructions, when executed by the one or more computers, cause the NTB link arbitration system to perform operations comprising:
   arbitrating usage of the first subset of NTB links and the second subset of NTB links by storage software, to cause a first subset of the storage software memory access operations on the peer memory to be implemented on the first subset of NTB links and to cause a second subset of the storage software memory access operations on the peer memory to be implemented on the second subset of NTB links, while causing all of the host IO device memory access operations on the peer memory to be implemented on the first subset of the NTB links.

8. The storage engine of claim 7:
wherein the host IO devices are configured to transmit NTB link usage information associated with each host IO device memory access operation implemented on the peer memory to the NTB link arbitration system; and
wherein the storage software is configured to transmit NTB link usage information associated with each storage software memory access operation implemented on the peer memory to the NTB link arbitration system.

9. The storage engine of claim 8, wherein the instructions, when executed by the one or more computers, further cause the NTB link arbitration system to perform operations comprising:
using the host IO device NTB link usage information and the storage software NTB link usage information to update NTB link data usage values of a NTB usage data structure, the NTB usage data structure including a data usage value for each of the NTB links; and
using the NTB link data usage values, by the NTB link arbitration system, to select a respective NTB link to be used to implement each respective storage software memory access operations on the peer memory.

10. The storage engine of claim 9, wherein the NTB link data usage values are exponential moving average NTB link usage values.

11. The storage engine of claim 9, wherein using the NTB link data usage values by the NTB link arbitration system comprises selecting the respective NTB link with a lowest respective NTB link data usage value.

12. A non-transitory tangible computer-readable medium storing software for implementing non-transparent bridge selection in a storage engine including multiple unequally shared Non-Transparent Bridge (NTB) resources including a plurality of NTB links interconnecting a local compute node and a peer compute node within the storage engine, comprising instructions executable by one or more computers which, upon such execution, cause the one or more computers to perform operations comprising:
implementing host Input/Output (IO) device memory access operations on a peer memory in a peer compute node by host IO devices residing on the local compute node, the host IO devices being connected to the peer memory by a first subset of the NTB links to a peer Peripheral Component Interconnect Express (PCIe) root complex in the peer compute node;
implementing storage software memory access operations on the peer memory in the peer compute node by storage software instantiated on the local compute node, the storage software being configured to access the peer memory by both the first subset of the NTB links to the peer PCIe root complex in the peer compute node and by a second subset of the NTB links to the peer PCIe root complex in the peer compute node; and
arbitrating usage of the first subset of the NTB links and the second subset of the NTB links by the storage software, to cause a first subset of the storage software memory access operations on the peer memory to be implemented on the first subset of the NTB links and to cause a second subset of the storage software memory access operations on the peer memory to be implemented on the second subset of the NTB links, while causing all of the host IO device memory access operations on the peer memory to be implemented on the first subset of the NTB links.

13. The non-transitory tangible computer-readable medium of claim 12, wherein the first subset of the NTB links comprise a first plurality of the NTB links; wherein the second subset of the NTB links comprise a second plurality of NTB links; and wherein the first subset of the NTB links does not include any NTB link included in the second subset of the NTB links.

14. The non-transitory tangible computer-readable medium of claim 12, further comprising:
transmitting host IO device NTB link usage information associated with each host IO device memory access operation implemented on the peer memory to an NTB link arbitration system; and
transmitting storage software NTB link usage information associated with each storage software memory access operation implemented on the peer memory to the NTB link arbitration system.

15. The non-transitory tangible computer-readable medium of claim 14, wherein arbitrating usage of the first subset of the NTB links and the second subset of the NTB links by the storage software comprises:
using the host IO device NTB link usage information and the storage software NTB link usage information to update NTB link data usage values of a NTB usage data structure, the NTB usage data structure including a data usage value for each of the NTB links; and
using the NTB link data usage values, by the NTB link arbitration system, to select a respective NTB link to be used to implement each respective storage software memory access operations on the peer memory.

16. The non-transitory tangible computer-readable medium of claim 15, wherein the NTB link data usage values are exponential moving average NTB link usage values.

17. The non-transitory tangible computer-readable medium of claim 15, wherein using the NTB link data usage values by the NTB link arbitration system comprises selecting the respective NTB link with a lowest respective NTB link data usage value.

* * * * *